United States Patent [19]

Bennett

[11] 3,875,588

[45] Apr. 1, 1975

[54] MAGNETIC TAPE DUPLICATING APPARATUS

[75] Inventor: William P. Bennett, Northbrook, Ill.

[73] Assignee: Programming Technologies, Inc., Chicago, Ill.

[22] Filed: Mar. 5, 1974

[21] Appl. No.: 448,412

[52] U.S. Cl. ........................ 360/15, 360/71, 360/74, 360/91

[51] Int. Cl.... G11b 5/86, G11b 15/22, G11b 15/43

[58] Field of Search ............ 360/15, 74, 78, 90, 71, 360/83, 64, 13, 27; 226/49-51; 242/201-203, 189, 195, 182

[56] References Cited

UNITED STATES PATENTS

| | | | |
|---|---|---|---|
| 2,528,279 | 10/1950 | Leedy et al. | 360/15 |
| 2,623,750 | 12/1952 | Masterson | 360/74 |
| 2,856,464 | 10/1958 | Groom | 360/91 |
| 3,177,299 | 4/1965 | Smith | 360/15 |
| 3,485,961 | 12/1969 | Lovick et al. | 360/15 |
| 3,519,762 | 7/1970 | Morris | 260/91 |
| 3,614,342 | 10/1971 | Siebert | 360/78 |
| 3,777,075 | 12/1973 | Hendershot et al | 360/91 |

*Primary Examiner*—Alfred H. Eddleman
*Attorney, Agent, or Firm*—Lawrence S. Lawrence

[57] ABSTRACT

A multiple magnetic tape duplicating apparatus is provided for simultaneously recording information from a master tape on a plurality of slave tapes, which comprises a playback assembly for alternately transporting a master tape, preferably having at least two tracks in a forward and reverse direction, including a pair of transducer heads adapted to pick-up recorded information from one track of said master during forward operation and from the other track during reverse operation; and a pair of multiple recording slave banks for duplicating said recorded information on a plurality of slave tapes. The slave banks include an individual recording station for each slave tape and are arranged such that all of the slave tapes of one bank are simultaneously recorded in the forward direction of the master tape, and all of the slave tapes of the other bank are simultaneously recorded in the reverse direction of the master tape to maintain continuous multiple duplication in both master tape directions.

20 Claims, 7 Drawing Figures

MAGNETIC TAPE DUPLICATING APPARATUS

BACKGROUND OF THE INVENTION

In recent years the increasing popularity of tape recorded material has required the development of devices capable of simultaneously duplicating such recorded material from a master tape onto a plurality of slave tapes. The speed and efficiency of such devices, of course, has a direct bearing upon the quantity of such tapes available for distribution to the public and the price thereof. Typical of the duplicating apparatus presently in use is the device shown in U.S. Pat. No. 3,177,299 to Smith.

Smith discloses a multiple tape recorder which utilizes a common capstan drive for both the master tape and a plurality of slave tapes upon which information from the master is to be simultaneously recorded. Although this device clearly provides multiple duplication, it unfortunately has several disadvantages which render it unsuitable for high quantity production. Firstly, the number of slave tapes that it is capable of receiving at any one time is relatively small, so that a great number of such devices to produce a large quantity of duplicated tapes is required. In addition, the common capstan drive mechanism for the master and slave tapes drives such tapes at the same speed so that the length of each duplicating tape must be equal to the length of the master tape. This is an inefficient utilization of the tape, particularly if the duplicated tapes are to be used in cassettes having limited capacity. Moreover, the Smith device is capable of operation in but a single direction, thus requiring the slave tapes to be stopped while the master is rewound to its starting position.

Other devices have been provided which overcome some of the inherent deficiencies in the Smith device. However, in many instances, such devices were not intended for use with magnetic tape and their adaptation for such use is often difficult. For example, U.S. Pat. No. 2,528,279 to Leedy, et al. discloses a multiple wire recorder which utilizes a common capstan to simultaneously drive both a master wire and a plurality of slave wires upon which information from the master is to be recorded. As in the Smith device, Leedy, et al. included a common capstan, but in this case the capstan has a stepped portion of larger diameter to drive the master wire at a speed greater than the drive speed of the slave wires. In addition, Leedy, et al. also includes provisions to receive two master recordings, one to operate in the forward pick-up direction, and the other to simultaneously operate in the rewind non-pick-up direction to provide continuous master reproduction during both the forward and rewind modes of the master. Although the concept of the Leedy, et al. device is more efficient than that of Smith in that it permits the master to operate at a higher speed than the slave tapes and also permits continuous recording without the necessity of stopping the apparatus to rewind the master, this device also suffers from several disadvantages, namely that its capacity if adapted for use with tape rather than wire would be relatively small, and that the two master tapes must be properly synchronized since they both play back onto the same slave recordings.

Moreover, none of the devices presently in use for accomplishing multiple recordings are capable of rapidly feeding both the master and slave tapes since most use relatively unsophisticated guide means for such tape. Although the use of the common capstan synchronizes the speed of the master and the slave, this does not insure rapid reproduction. Means must still be provided to accomplish high speed tape transport, and unfortunately, the present devices lack such capability.

SUMMARY OF THE INVENTION

In accordance with the present invention a magnetic tape duplicating apparatus is provided for simultaneously recording information from a master tape on a plurality of slave tapes, which overcomes all of the disadvantages and deficiencies associated with prior duplicating devices. This is accomplished by preferably utilizing a master tape having at least two recording tracks containing the information to be reproduced and providing means for alternately transporting such master tape in a forward and reverse direction in a manner such that the information from one track is retrieved in the forward direction of the master tape and the information from the second track is retrieved in the reverse direction of the master tape. Alternatively, a master tape having a single track can also be utilized, and in such instance the information from the single track is retrieved in both directions. In this manner, continuous reproduction can be maintained in both directions of the master to increase production speed without the problem of rewinding or synchronizing two masters. In addition, at least two banks of multiple slave tapes are provided, so that the overall slave tape capacity of the present invention greatly exceeds that of prior devices. Moreover, the banks are arranged and controlled such that the slave tapes of one bank are simultaneously recorded in the forward direction of the master tape and the slave tape of the second bank are rercorded in the reverse direction of the master tape, thus assuring continuous multiple recordings without interruption for rewinding or resupplying and loading blank slave tapes. In addition, the present invention also includes means to minimize tape tension and control the speed to provide more efficient and reliable tape duplication.

In general, the multiple tape duplicating apparatus of the present invention comprises, in combination, a play-back assembly for alternately transporting a master tape in a forward and reverse direction; means for controlling the tension on such tape and maintaining a constant speed; transducer means to pick-up recorded information from the master tape while such tape is traveling in either a forward or a reverse direction; a pair of multiple recording slave banks for duplicating said recorded information on a plurality of slave tapes; and a common capstan drive means for the master tape playback assembly and both slave banks to advance the master and slave tapes and maintain speed synchronization therebetween; said banks being alternately operable such that all of the slave tapes of one bank are simultaneously recorded in the forward direction of the master tape and all of the slave tapes of the other bank are simultaneously recorded in the reverse direction of the master tape.

In addition to the foregoing, the duplicating apparatus of the present invention also includes an automatic control system having means to reverse the direction of the master tape and correspondingly switch from one slave bank to the other. The means for controlling tape tension and maintaining speed is linked to the control system to accommodate the master tape direction reversal and provide the necessary control in both directions.

The invention also includes individual recording stations having independent recording transducers for each slave tape in both banks, and a multiple amplification and recording circuit connecting the pick-up transducer means of the playback assembly and each of such recording transducers.

The playback assembly comprises reversible take-up and feed reels each of which is operatively connected to an electrically operated drive motor by means of an individual clutch-brake device, which controls the corresponding take-up and feed speeds of the master tape. The clutch-brake devices are preferably of the pneumatic type, whereby the amount of air pressure fed thereto controls the drag placed upon the particular reel to which it is connected. However, it should be noted that other clutch-brake systems, such as electromagnetically operated devices can also be adapted for use in the present invention. The drive motors are conventional reversible electric motors and are connected to the clutch-brake devices by means of a drive belt or the like.

The common capstan drive means comprises an elongated cylindrical shaft disposed centrally of the take-up and feed reels of the playback assembly and extending between the two slave banks. A reversible electric motor of conventional design is operatively connected to the shaft by means of a belt or the like to rotatably drive the same. A pinch roller disposed in the playback assembly adjacent the drive capstan is adapted to hold the master tape in operative engagement therewith to permit its advancement in either direction past the pick-up transducer means. The pinch roller is preferably movable out of engagement with the tape by means of a pneumatic cylinder, a solenoid or the like to prevent damage to the master tape upon its change in feed direction. The common shaft of the master and slave capstan maintains proper speed synchronization between the master and slave tapes and thus avoids reproduction distortions, which can occur due to uneven speed variations in the playback and recording means of prior devices. In the common capstan system of the present invention, although slight speed variations in the rotational movement of the capstan can still occur, each of the slave tapes and the master tape will be uniformly affected thereby, so that no distortions of the reproduced sound will occur.

When reproducing magnetic tapes for use in cassettes and cartridges, it is desirable that the playback speed of the reproduced tape be low so that a relatively large capacity of recorded information can be reproduced on a relatively small amount of tape. For example, in the case of tape cassettes commonly in use, the normal playback speed for the tape is 1⅞ inches per second. It has been found, however, that the fidelity of original recordings is maintained at a higher level if such recordings are made at a greater speed, and in this regard it is usually common to record a master tape at a speed of 7½ inches per second, which is exactly four times the playback speed of the cassette tape. Accordingly, to maintain the proper speed relationship between the master tape and the slave tapes, the drive capstan preferably has a stepped up diameter in the playback assembly for the master tape which is four times as large as the diameter of the remaining capstan shaft for the slave tapes. It should be emphasized, however, that any other desirable ratio between the master and slave capstans can be provided to maintain any other speed relationship between the master and slave tapes.

Moreover, it should also be noted that although the normal playback speed for the master is 7½ inches per second, in the reproducing mode such speed can be and preferably is greatly increased to effectuate high speed multiple reproduction. It has been found that the duplicating apparatus of the present invention can be used at a master tape playback speed of from 75 to 90 inches per second. Since a common capstan shaft is utilized, the speed relationship between the master and the slaves will be automatically maintained.

The means for controlling the master tape tension and speed comprise a pair of vacuum plenums positioned on each side of the master capstan. The plenums are preferably in the form of elongated vertically disposed rectangular chambers, the internal thickness of which corresponds to the width of the master tape, so that such tape sealably engages the sides of the chambers to permit the creation of a pressure differential thereacross. Each chamber is adapted to receive therein a loop of master tape in a manner which serves to minimize the drive friction of such tape, to control the tape speed and tension, and to permit rapid reversal of the tape feed direction. It should be noted that the chambers are designed such that the flat surface of the tape loops contact the sides of the vacuum plenums only immediately adjacent the curved end portions of the loops to insure minimum friction. The plenums include vacuum ports at their lower ends connected to a suitable vacuum pump, and pressure or flow sensing ports at a mid-point thereof connected to suitable vacuum switches responsive to such flow or pressure. The switches are in turn operatively connected via the control system to the clutch-brake devices for each of the two master reels, so that relatively constant loop sizes and take-up and feed speeds can be maintained. The vacuum plenums are designed such that when a loop of tape drops below the vacuum sensing port, the pressure or flow sensed by the switches is increased indicating that the take-up speed is insufficient, if such loop is in the plenum on the take-up side of the capstan, or that the feed speed is too great if the loop is in the plenum located on the feed side of the capstan. Similarly, if the loops are above the sensing ports, the pressure or flow sensed by the switches is decreased indicating that the take-up speed is too great (on the take-up side) or that the feed speed is insufficient (on the feed side). The vacuum switches control the torque created by the clutch-brake devices to thereby maintain the speed and permit the proper increase and/or decrease in the loop sizes. In addition, the speed control created by the vacuum plenums also serves to reduce tape tension, so that the pressure exerted by the tape upon the pick-up transducer means is reduced. This greatly improves the quality of the reproduced tapes by eliminating flutter and wow (flutter being caused by rapid speed variations and wow being caused by low frequency speed variations), and also increases the life of the master tape and the transducers by reducing wear and tear.

The means provided to automatically reverse the direction of master tape travel is adapted to be activated when the master tape is fully extended in one direction or the other. In the preferred embodiment, such reversal means comprises a pair of photoelectric cells, each disposed in one of the vacuum plenums and connected to the control system to reverse the direction of the capstan drive motor and the take-up and feed reel motors of the master tape in the play-back assembly and to switch slave banks upon actuation. To accomplish such actuation the master tape is provided with a transparent leader portion attached to the forward and trailing ends thereof and the photoelectric cells are adapted to sense such transparent leader and thereby activate the control system. It will be apparent to those skilled in the art that other suitable reversal means can also be employed. Such alternative means includes a transducer to sense a control pulse on the tape, a pneumatic sensing device responsive to an opening in the tape, or a mechanical counter responsive to a predetermined length of tape passing thereacross.

The pick-up transducer means in the playback assembly comprises a pair of heads disposed between the capstan drive and each of the vacuum plenums. As noted hereinbefore, the master tape preferably has at least two tracks, one of which is recorded in the forward direction and the other of which is recorded in the reverse direction. One of the transducers is adapted to pick-up recorded information from the first track when the tape is traveling in the forward direction and the other of such transducers is adapted to pick-up recorded information on the second track when the tape is traveling in the reverse direction. The alternate transducers can also be utilized to pick up recorded information from a single track in both directions. It should be noted that the transducer heads can be made selectively operable to pick-up either mono or stereo tracks on the master tape, or that additional selectively operable heads can be included in the tape plate to pick-up stereo tracks.

The recorded information on the master tape, which is picked up by the aforementioned transducers, is simultaneously recorded on all of the slave tapes, located in either one of the two slave banks. The banks are arranged in parallel juxtaposition on opposite sides of the common capstan drive shaft. In this manner, rotation of the capstan in one direction advances the slave tapes in one bank from their supply reels to their take-up reels, and rotation of the capstan in the opposite direction advances the slave tapes in the other bank from their supply reels to their take-up reels. Pneumatically or electromagnetically operated pinch rollers are provided to contact each slave tape and thereby hold the same in operative engagement with the capstan shaft when the particular bank in which such tape is located is in operation. The pinch rollers for each bank are operatively connected to the control system and are alternately actuated upon the reversal of the master tape, so that the slave banks are automatically switched from one to the other to provide continuous record reproduction in both the forward and reverse directions of the master tape. The supply and feed reels provided in each slave bank of the recording assembly are each operatively connected to a individual torque drive motor which controls the drag on the slave tape. A pneumatic type brake is provided at each slave supply reel which prevents overspill when the tape is stopped.

As in the case of the pick-up transducers in the playback assembly, the recording transducers associated with each feed and supply reel in the recording assembly can be adapted to record either in mono or in stereo on the desired number of tracks. It should be noted that it is preferable to provide separate recording heads for each track to be recorded so as to reduce cross-talk and improve the sound quality of the reproduced tapes. The amplification and recording circuit connects the pick-up transducer head and each of the recording transducer heads to effectuate tape duplication. The circuit is of the conventional type including a preamp connected to the pick-up transducer, an audio level control, an equalization stage to equalize the frequency response to the amplifier to meet standard frequency requirements and an individual power amplifying circuit including an audio level control connected to the recording head for each slave tape. It should be noted that the individual power amplifying circuits included for each slave tape can be arranged on individual plug-in cards, to facilitate servicing and replacement. In addition, the reproduction circuits can also include means to insert control tones to edit pulses on the tape being reproduced so as to facilitate the further processing of such tape, such as the insertion thereof in cassettes and/or cartridges.

The logic control system effectuates the automatic reversal of the drive direction of the master tape and the corresponding switching from one bank of slave tapes to the other, and in addition, also provides for the automatic transfer of the vacuum control of the brake-clutch devices from feed to take-up upon reversal of the master tape. The system includes a series of relays or other switching devices well known in the art adapted to be controlled by the reversing means and the vacuum switches.

The foregoing and additional features of the invention are more fully described with reference to the annexed drawings.

DETAILED DESCRIPTION OF THE PREFERRED EMBODIMENT

Figure 1:
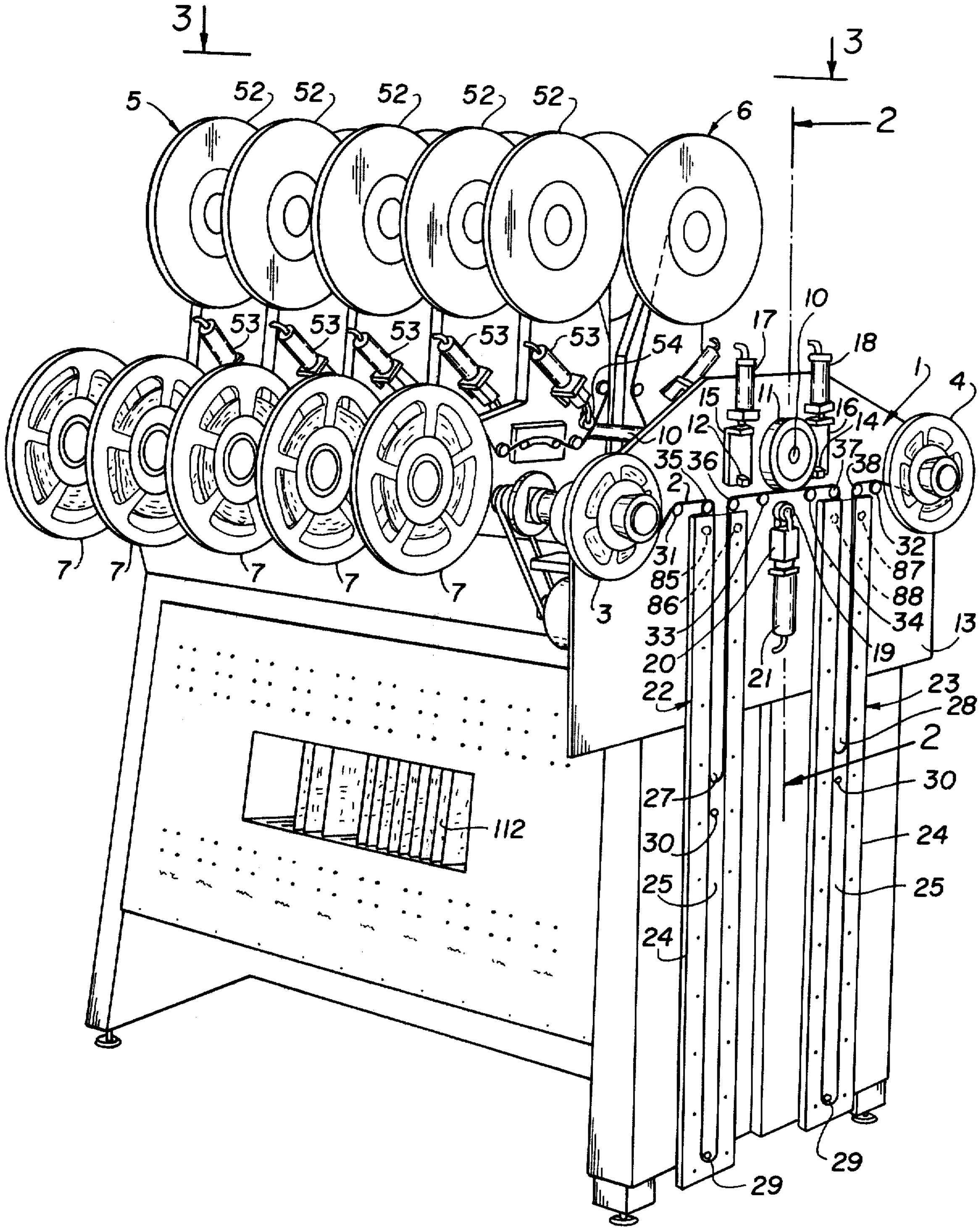
FIG. 1 is a perspective view showing the front and side of the magnetic tape duplicating apparatus of the invention.

Referring now to FIG. 1, it can be seen that the multiple magnetic tape duplicating apparatus of the invention comprises a playback assembly 1 for retrieving recorded information from a master tape 2 while such tape is advanced in a forward or reverse direction between a pair or motor driven feed and take-up reels 3 and 4; and a pair of multiple recording slave banks 5 and 6 each having a plurality of individual recording stations 5*a* and 6*a*, respectively, for simultaneously duplicating the recorded information retrieved from master tape 2 on a plurality of slave tapes contained on feed reels 7 in bank 5 and feed reels 8 (FIG. 3) in bank 6. The operation of banks 5 and 6 is controlled in a manner such that all of the slave tapes in bank 6 are simultaneously recorded when master tape 2 is advanced from reel 3 to reel 4, and all of the slave tapes in bank 5 are simultaneously recorded in the reverse direction of master tape 2 when it is advanced from reel 4 to reel 3, so as to maintain continuous multiple tape duplication in both master tape directions, thus avoiding the need to cease tape reproduction during a master rewind mode. It should be noted in this regard that in the preferred embodiment master tape 2 is provided with at least two recording tracks containing information to be reproduced, and that the information from one track is retrieved while the tape is traveling in one direction, and the information from the second track is retrieved while the tape is traveling in the opposite direction.

To insure proper synchronization the master tape 2 and each of the slave tapes contained in banks 5 and 6 are advanced between their respective take-up and feed reels by means of a common capstan drive shaft 10 which extends between slave banks 5 and 6 and includes an enlarged end portion 11 positioned in the center of playback assembly 1 to engage and advance the master tape. The purpose of the enlarged end portion 11 is to advance the master tape at a greater speed than the slave tapes, and in the preferred embodiment it is desirable that the speed ratio between the master and the slaves be 4:1. Accordingly, enlarged end 11 has a diameter which is exactly four times greater than the diameter of the main portion of shaft 10. Shaft 10 is formed from non-magnetic stainless steel material and the enlarged end portion 11 comprises a hard elastomer wheel fixedly attached thereto.

The playback assembly 1 also includes a pair of alternately operable pick-up transducers 12 and 14, transducer 14 being operable to retrieve information from one track of tape 2 while such tape is traveling from reel 3 to reel 4 and transducer 12 being operable to retrieve information from the second track of tape 2 while such tape is traveling from reel 4 to reel 3. The transducers 12 and 14 are fixedly mounted on slidable plates 15 and 16, respectively, which plates are movable between an operative position in which the transducer mounted thereon is in engagement with tape 2, and an inoperative position as shown in FIG. 1, in which the transducers are out of engagement with the master tape. Plates 15 and 16 are, respectively, connected to pneumatically operated cylinders 17 and 18 fixedly attached to mounting plate 13, which provide the motive force to slidably move such plates between their respective operative and inoperative positions. A pinch roller 19 is rotatably mounted on a slidable bracket 20 disposed below the path of master tape 2 adjacent the enlarged end portion 11 of the capstan shaft 10, and a pneumatic cylinder 21, which is also fixedly attached to mounting plate 13, is adapted to move bracket 20 and pinch roller 19 between an inoperative position as shown in FIG. 1 in which pinch roller 19 is out of engagement with tape 2 and an operative position in which roller 19 urges tape 2 into engagement with the enlarged capstan portion 11.

The master tape playback assembly 1 also includes a pair of vacuum plenums 22 and 23 for controlling the master tape tension and speed positioned on each side of the master capstan. The plenums each comprise a vertically disposed rectangular plate 24 having an elongated channel-like chamber 25 formed therein. The depth of which corresponds to the width of master tape 2. A transparent face-plate 26, best seen in FIG. 3, sealably encloses the front of each chamber 25, so that the edges of the master tape can sealably engage the bottom and sides of each chamber and the internal surface of the face-plate to permit the creation of a pressure differential across such tape. As shown in FIG. 1,, vacuum plenums 22 and 23 are each adapted to receive therein a loop 27 and 28, respectively, of master tape in a manner which serves to minimize the drive friction of such tape and through the operation of the vacuum plenums, as hereinafter described, to control tape speed and tension and permit rapid reversal of the tape feed direction. It should be noted that chambers 25 have parallel vertical sides so that only the lower portion of tape loops 27 and 28, immediately adjacent the curved end portions thereof, contact such vertical sides, and in this manner insure minimum drive friction between the tape and the vacuum plenums.

Plenums 22 and 23 include evacuation ports 29 disposed at the bottom of each chamber 25. Ports 29 are in communication with a suitable vacuum pump (not shown) which is adapted to reduce internal pressure within each chamber 25 to a point below atmospheric. In addition, a vacuum sensing port 30 is disposed within each plenum 22 and 23 in communication with chamber 25 at a midpoint thereof. Both ports 30 are connected to individual vacuum switches 95 and 96 (shown in FIG. 6) responsive to the pressure within chambers 25. The switches are in turn operatively connected via the control system, which will be described hereinafter, to the drive mechanism for each of the two master reels 3 and 4 to control the take-up and feed speed of such reels and thereby maintain relatively constant loop sizes. It can be seen that when a loop of tape 27 or 28 drops below either vacuum sensing port 30, the pressure sensed by the switches connected to such port is increased, since the tops of the plenums are open to atmosphere, indicating that the take-up speed is insufficient, if such loop is in the plenum on the take-up side of capstan 10, or that the feed speed is too great if such loop is in the plenum located on the feed side of capstan 10. In other words, if the tape is traveling from reel 3 to reel 4, and loop 27 drops below port 30 in vacuum plenum 22, the vacuum switch receives an increased pressure and is operative to reduce the feed speed of reel 3 so as to reduce the size of loop 27. If loop 28 in vacuumm plenum 23 drops below port 30, the corresponding vacuum switch also receives an increased pressure and it too will provide a control signal operative to increase the speed of reel 4, and thus reduce the size of loop 28. Similarly, if loops 27 and 29 are above ports 30, the pressure sensed by the vacuum switches is decreased, since the tape separates the ports from the open top of the plenums, indicating that the take-up speed of reel 4 is too great, or that the feed speed of reel 3 is insufficient. Similarly, when the direction of the master tape 2 is reversed, so that such tape is advanced from reel 4 to reel 3, the control logic of the switches connected to vacuum plenums 22 and 23 is likewise reversed.

The tape path between reels 3 and 4 also includes guide rollers 31 and 32 disposed immediately adjacent the aforesaid reels, guide rollers 33 and 34 disposed on both sides of capstan 10, guide rollers 35 and 36 disposed adjacent the top opening of vacuum plenum 22 and guide rollers 37 and 38 disposed adjacent the top opening of vacuum plenum 23.

Figure 2:
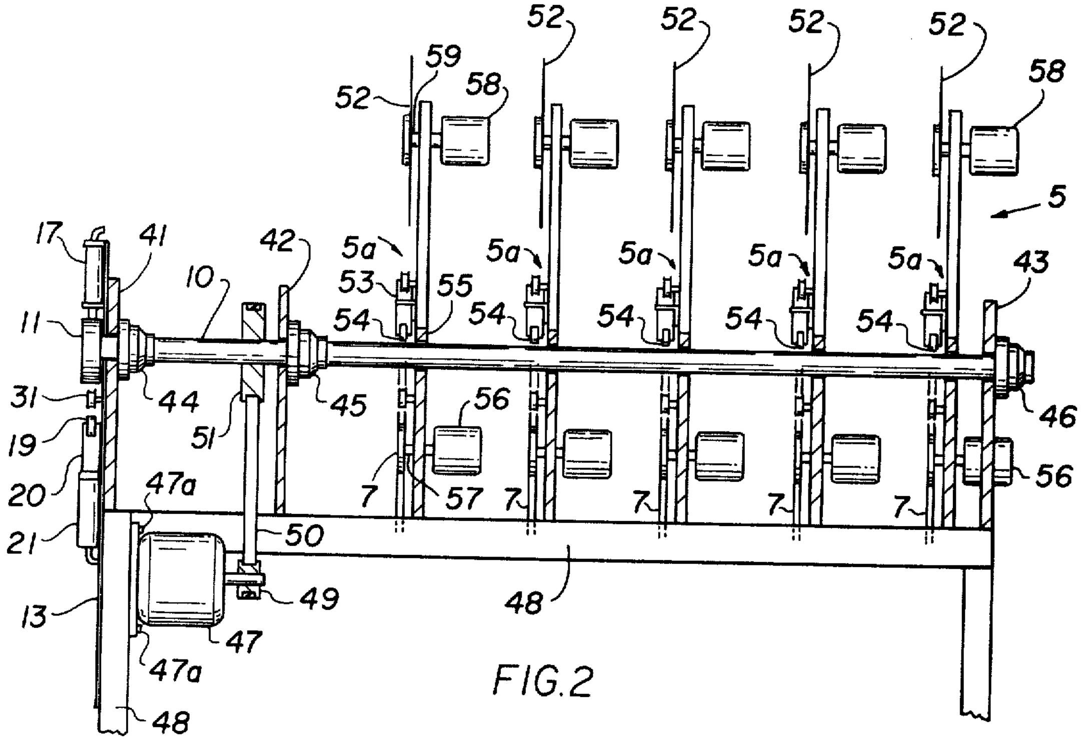
FIG. 2 is a cross-sectional view of the tape duplicating apparatus taken along the lines 2—2 of FIG. 1.

Referring now to FIG. 2, it can be seen that the drive capstan shaft 10 is journaled through three bearing plates, 41, 42, and 43, by means of rotational bearings 44, 45, and 46, respectively. The number and type of bearings and bearing plates required to support shaft 10 depends, of course, on the number of recording stations in each slave bank. In the embodiment shown there are five such recording stations, and it has been found that the three bearings as shown is sufficient to adequately support shaft 10 for concentric rotational movement throughout its length. The capstan shaft 10 is rotationally driven in both a forward and reverse direction by means of an electric reversible drive motor 47, of the conventional induction type well known in the art. Motor 47 is mounted on a support frame 48 by means of a series of bolts 47*a*, and is linked to capstan shaft 10 by means of a pulley 49 connected to the drive shaft of motor 47, a corresponding pulley 51 fixedly mounted on capstan shaft 10, and a flexible drive belt (or belts) 50 connecting pulleys 49 and 51. The size of the pulleys is designed to accomodate the motor and to rotate the capstan at the desired speed.

Figure 5:
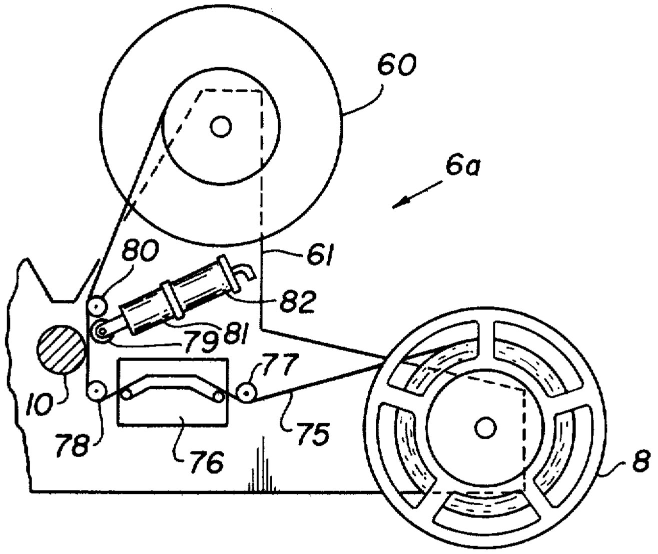
FIG. 5 is a partial front view of one slave tape recording station taken along the lines 5—5 of FIG. 3.

FIG. 2 also shows the five individual recording stations 5*a* which comprise slave bank 5. Each such recording station comprises a feed reel 7, a take-up reel 52, and a slave tape path extending therebetween, which path is defined in part by drive capstan 10. and a pinch roller 54, operatively connected to a pneumatic cylinder 53 for movement into and out of engagement with capstan 10. Additional details of each slave tape recording station are shown in FIG. 5 and will be more fully described hereinafter. All of the components of each slave tape recording station 5*a* are mounted on an upstanding plate 55 or the like fixedly secured into the frame 48 of the multiple recording device. Attached to the rear of each plate 55 is a drive motor 56, operatively connected by means of a rotatable shaft 57 to feed reel 7, and a corresponding motor 58 connected by means of a second rotational shaft 59 to take-up reels 52. Motors 56 and 58 are arranged such that motor 56 opposes the feed of reel 7 to serve as a tensioning brake, and motor 58 favors the take-up reel 52. It should be noted that the motors are arranged such that motor 58 rotationally drives reel 52 at a take-up speed greater than the feed speed of capstan shaft 10 to ensure that the proper amount of tension will be maintained on the tape. Similarly, capstan shaft 10 is sufficiently powerful to overcome the drag of motor 56, thus assuring continuous tape feed from reel 7. By arranging the take-up and feed reels in this manner, the problem of overspill or backlash in the event that the tape breaks or is stopped is overcome. It should be noted that motor 56 can alternately be replaced with either an electromagnetic or pneumatic tensioning brake or any other similar device well known in the art which is adapted to provide a drag on reel 7.

Figure 3:
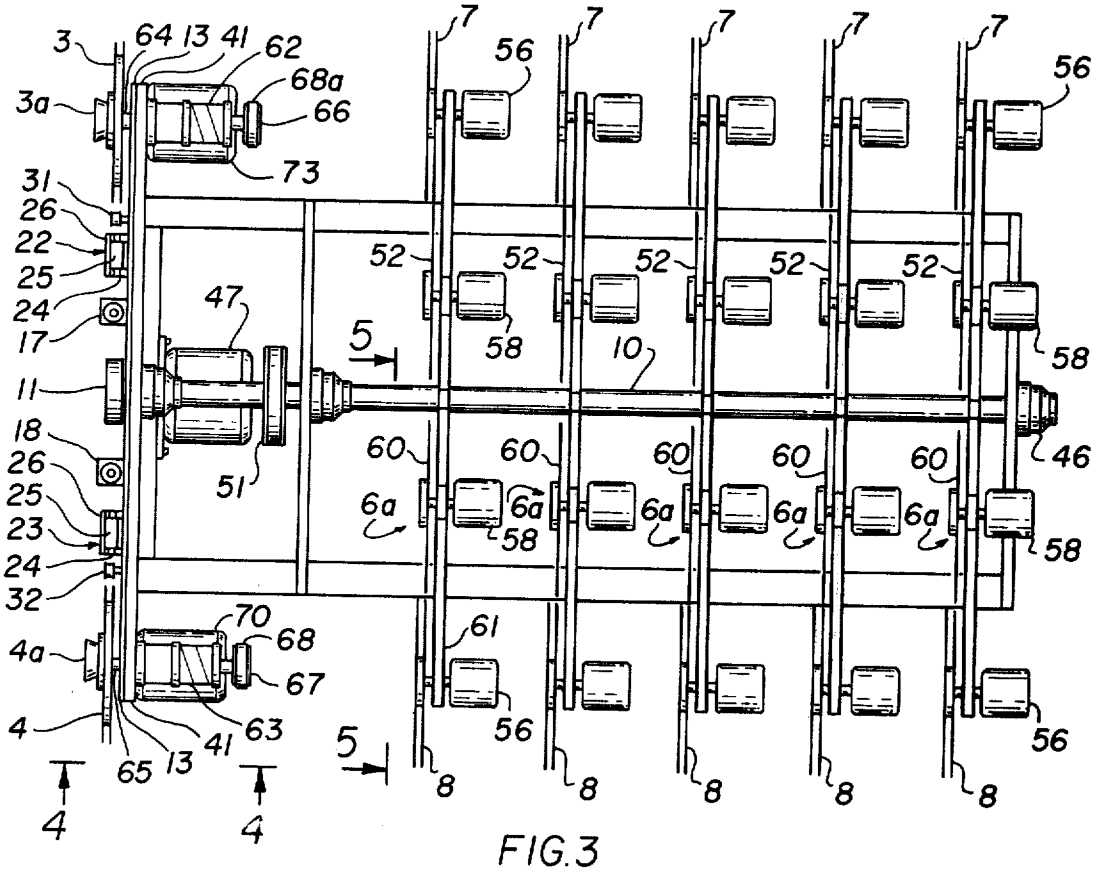
FIG. 3 is a top plan view of the tape duplicating apparatus taken along the lines 3—3 of FIG. 1.

Referring now to FIG. 3, it can be seen that slave bank 6 is a mirror image of slave bank 5 and also includes a plurality of feed reels 8 and a plurality of corresponding take-up reels 60, each disposed in an individual recording station 6*a* mounted on an upstanding plate 61 or the like. As in the case of slave bank 5, each recording station 6*a* in slave bank 6 also includes a drive motor or tensioning brake 56, operatively linked through mounting plate 61 to feed reel 8, and a take-up motor 58 operatively connected to take-up reel 60.

Figure 4:
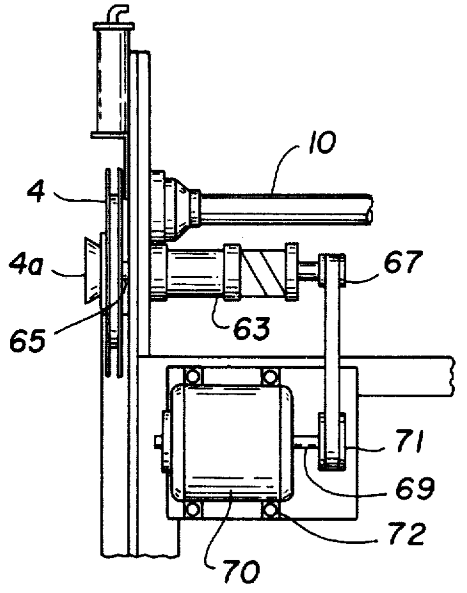
FIG. 4 is a partial side view of the drive mechanism for one of the master tape reels of the duplicating apparatus taken along the lines 4—4 of FIG. 3.

Master tape reels 3 and 4 in playback station 1 are operatively connected via mounting plate 13 and bearing plate 41 to electromagnetically operated clutch-brake devices 62 and 63, respectively. The clutch-brake devices 62 and 63 include central drive spindles 64 and 65 adapted to receive reels 3 and 4, respectively. The reels are secured in place by means of hubs 3*a* and 4*a*, which engage the ends of the spindles. The opposite ends of the clutch brake devices 62 and 63 include pulleys 66 and 67, respectively, which are connected by means of drive belts 68 and 68*a* to the drive shaft of reversible drive motors 70 and 73. As shown in FIG. 4, a pulley 71 is attached to the end of drive shaft 69 of motor 70, which is fixedly mounted by means of bolts 72 to the frame of the multiple recording device. Although FIG. 4 shows only the connection between clutch-brake device 63 and its corresponding motor 70, it will be appreciated by those skilled in the art that the connection between brake-clutch device 62 and its corresponding motor 73, is exactly the same.

Motors 70 and 73 are conventional reversible type induction motors, which are quite well known in the art, and are adapted to operate in both the forward and reverse directions and at substantially constant speeds. Accordingly, all speed adjustments to the master tape feed, as controlled by vacuum plenums 22 and 23, are made by the clutch-brake devices 62 and 63. It should be noted that although the specific embodiment shown in the drawings includes electromagnetic clutch-brake devices, pneumatically operated devices well known in the art are also suitable for use in the invention. These devices serve two functions; firstly, by means of the clutch portion to disconnect the master reels from their corresponding drive motors at the time of feed direction reversal to prevent breakage of the master tape, and, secondly, to control the speed of the reel by means of the brake portion, and it is the brake portion of the clutch-brake devices which are in the manner indicated above controlled by the vacuum switches.

The remaining details of each slave tape recording station 6*a* are illustrated in FIG. 5. It should be noted that this illustration is typical of each of the slave tape recording stations, 5*a* and 6*a* in both slave banks, and that the only difference between such recording stations is that recording stations 5*a* in bank 5 are the mirror image of recording station 6*a* shown in FIG. 5. It can be seen that slave tape 75 extends from feed reel 8 to take-up reel 60 along a path defined by a recording transducer 76, a pair of guide rollers 77 and 78 located on both sides of transducer 76, drive capstan shaft 10, a pinch roller 79 adapted to hold tape 75 in operative engagement with capstan 10, and finally guide roller 80 which insures proper alignment of tape 75 on take-up reel 60. Pinch roller 79 is attached to a slidable plate 81, which is movable by means of a fixedly mounted pnuematic cylinder 82 between an operative position in which pinch roller 79 holds tape 75 in contact with capstan 10, and in an inoperative position in which pinch roller 79 is out of engagement with the tape. Transducer 76 has at least one recording head for each track to be recorded upon slave tape 75 to insure high quality reproduction and to prevent cross-talk between the various tracks. It should be noted that if desired additional transducers can be provided upon plate 61 having different numbers of recording heads, which may be selectively included in the tape path to accomplish the desired mode of recording.

Referring back once again to FIG. 1, it can be seen that a photoelectric cell 85 and a corresponding light source 86 are disposed at the entrance to chamber 25 of vacuum plenum 22. Similarly, a second photoelectric cell 87 and a second corresponding light source 88 are likewise disposed at the entrance to chamber 25 of vacuum plenum 23. As is well known in the art magnetic recording tape is opaque, so that under normal operating conditions during which loops 27 and 28 are within their corresponding vacuum plenums 22 and 23, the light emitted from sources 86 and 88 is blocked by tape 2 and, therefore, does not reach photo cells 85, and 87, However, both ends of tape 2 are provided with a transparent leader portion which permits the passage of light. In this manner, when either of such leader portions enter the vacuum plenums, the light emitted from the sources is permitted to contact the corresponding photo-cell and an electrical signal is produced. Such signals are fed to the control circuit, which will be described with reference to FIG. 6, to automatically reverse the feed direction of the master tape in playback assembly 1, and to automatically switch from one slave bank to the other.

For example, when the master tape is traveling from reel 3 to reel 4, photo-cell 85 will be activated when the clear leader portion of tape 2 enters vacuum plenum 22. The signal generated by photo-cell 85 is operative to reverse the drive direction of motors 70 and 73 connected to reels 3 and 4, respectively, and of motor 47 connected to drive capstan 10, as well as to deactivate slave bank 5 and activate slave bank 6. Similarly, after such reversal and after the master tape has been wound upon reel 3, photo-cell 87 will be energized by the light from source 88 when the clear leader on the opposite end of tape 2 enters vacuum plenum 23. Thus, it can be seen that the master tape feed direction will be automatically reversed at the end of its travel in each direction.

In addition to controlling the direction of drive motors 70, 73 and 47, the activation of photo-cells 85 and 87 also control the operation of cylinders 17 and 18 to transport the proper transducer 12 or 14 into contact with tape 2, and the operation of pneumatic cylinder 21 to move pinch roller 19 into and out of engagement with the enlarged end 11 of drive capstan 10 so that pinch roller 19 disengages the capstan immediately prior to tape reversal to stop its travel in one direction, and engages the capstan after reversal of the motors to commence travel in the opposite direction. Similarly, the photo-cells also control the operation of pinch rollers 54 in slave bank 5 and pinch rollers 79 in slave bank 6, as well as the individual take-up and feed reel motors in both banks. In this manner, pinch rollers 54 and drive motors 56 and 58 in slave bank 6 are activated when the master tape is traveling from reel 3 to reel 4, and pinch rollers 79 and drive motors 56 and 58 in slave bank 5 are activated, when the master tape is traveling from reel 4 to reel 3. It should be noted that the pinch rollers are out of engagement with the drive capstan shaft 10 and the reel drive motors are deactivated in the non-operating bank.

Figure 6:
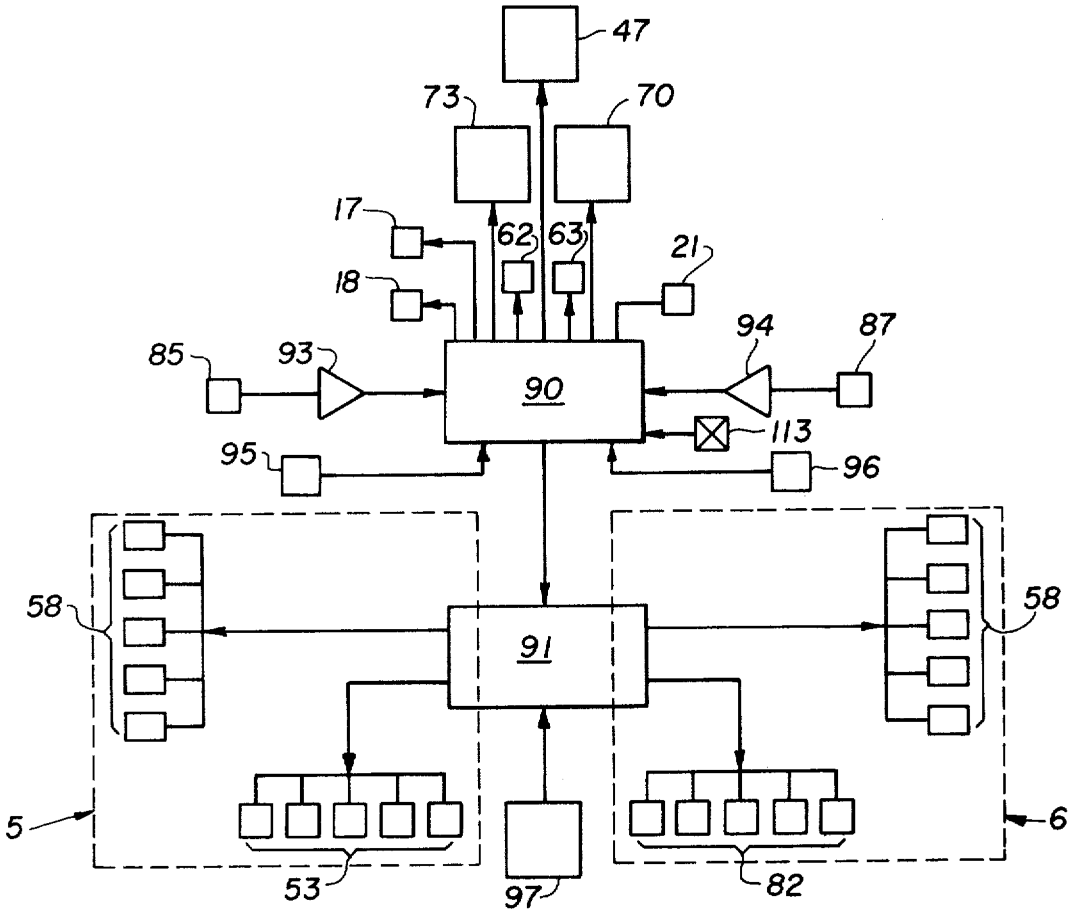
FIG. 6 is a schematic diagram showing the logic control system of the tape duplicating apparatus of the invention.

A schematic drawing of the logic system for automatically controlling the tension and feed speed of the master tape for reversing the master tape feed direction and for switching from one slave bank to another is illustrated in FIG. 6. The heart of the control system comprises a pair of electromechanical flip-flop (multiple relay) devices 90 and 91, flip-flop 90 being adapted to control the feed direction of the master tape in playback assembly 1, and flip-flop 91 being adapted to alternately activate slave bank 5 and slave bank 6. The primary inputs to flip-flop 90 are the signals produced by photo-cells 85 and 87, which are boosted by means of signal amplifiers 93 and 94, and are operative to reverse the master tape feed direction. Vacuum switches 95 and 96, which are respectively connected to sensing ports 30 of vacuum plenums 22 and 23, are also connected to flip-flop 90, so that upon activation by either photo-cell, the flip-flop 90 is operative to reverse the control logic of the vacuum switches from feed to take-up and visa versa to maintain proper speed and tension in both directions. Output signals from flip-flop 90 are directed to drive motor 47 for the capstan drive shaft to control its rotational direction, reel motors 70 and 73 and for the take-up and feed reels of the playback assembly to control rotational direction, the break-clutch devices 62 and 63, pneumatic cylinders 17 and 18 for controlling the alternate operation of transducers 12 and 14, and pneumatic cylinder 21 for controlling the position of master pinch roller 19. A further output signal from flip-flop 90 is directed as an input signal to the second flip-flop 91. In addition, a motion sense circuit 97 responsive to the motion of the drive capstan shaft 10 provides a second input signal to flip-flop 91 when the capstan comes to a complete stop. Output signals from flip-flop 91 are alternatively directed to drive motors 56 and 58 and pneumatic pinch roller cylinders 53 of slave bank 5 to energize such components when the master tape is traveling from reel 3 to reel 4, and drive motors 56 and 58 and pinch roller cylinders 82 of slave bank 6 to energize such components when the master tape is traveling from reel 4 to reel 3. Finally, a manual control switch 113 is provided in connection with flip-flop 90, the activation of which controls the flip-flop to place all of the components of the recording apparatus in a neutral tape load position.

Figure 7:
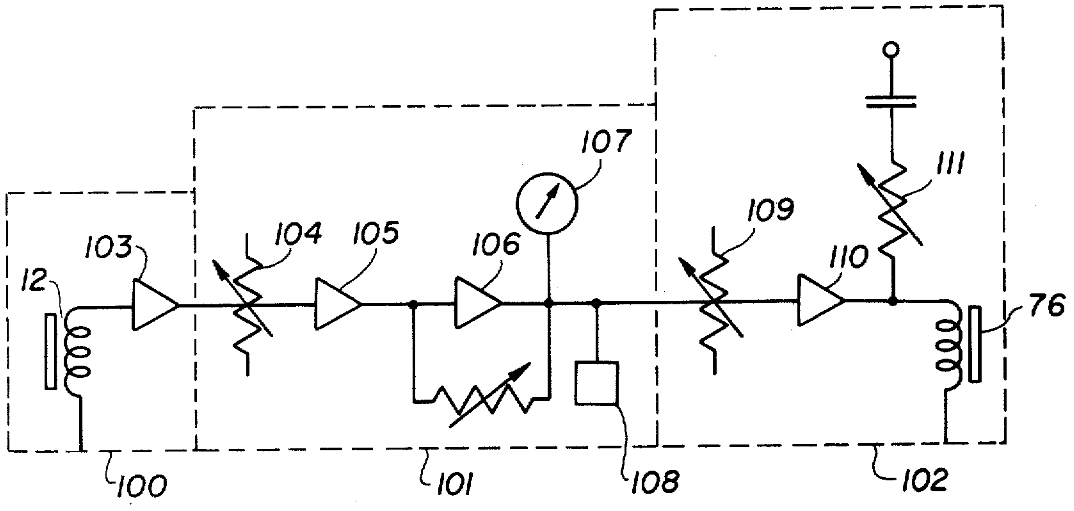
FIG. 7 is a schematic diagram of the amplifying and recording circuit linking the master pick-up transducers and the slave tape recording transducers.

FIG. 7 illustrates a schematic of the circuit for retrieving recorded information from the master tape and reproducing such recorded information on each slave tape. The circuit is of the three stage type comprising a pre-amp stage 100 associated with each pick-up transducer located in the playback assembly, equalization stage 101 and a recording stage 102 associated with each slave tape recording station. It should be noted that recording stage 102 represents but one channel of a multi-channel system, in which a separate recording stage is provided for each recording station in each of the slave banks 5 and 6. Stage 100 comprises the master tape pick-up transducer 12 and an amplifier 103. Although only transducer 12 is shown, it will be apparent that an individual pre-amp stage is provided for each transducer in the playback assembly, and that such stages are alternately placed in the circuit depending upon the feed direction of the master tape. In addition, it will also be apparent that separate transducers and corresponding pre-amp stages are also provided for each mono and/or stereo track on the master tape. Amplifier 103 boosts the signals received from pick-up transducer 12 and feeds such signals to equalization stage 101, which stage comprises an audio level control means 104, an equalization amplifier 105 to equalize the frequency response of the circuit to meet standard conditions, a DuKane circuit 106 for providing independent control of a 50 Hertz tone, an audio level meter 107, and an edit pulse generator 108, which has a frequency derived from the capstan speed and is adapted to insert edit pulses on each reproduced slave tape. Finally, recording stage 102 comprises an audio level control 109, which controls the signals received from equalization stage 101, and a power amplifier to boost such signals and feed the same to recording transducer 76. A bias circuit 111 is also provided to properly control the output of recording transducer 76. For ease of installation, and servicing the recording stage for each recording station is provided on individual plug-in cards. Referring for the moment to FIG. 1, such cards 112 can be seen inserted in the side of the recording console.

In operation, the operator first activates manual switch 113, which controls the position of flip-flop 90 and 91 to place each of the pinch rollers and drive motors of the playback assembly and the slave banks, as well as the movable transducers of the playback assembly into a neutral or inoperative position. Next, reels 3 and 4 containing master tape 2 is installed in the playback assembly with such tape extending over the appropriate guide rollers and through vacuum plenums 22 and 23. In addition, supply reels 7 and 8 of blank slave tape are installed in slave banks 5 and 6 with the tape thereon extending through the appropriate tape path in each recording station **5*a* and 6*a*** and suitably connected to their corresponding take-up reels.

The operator then deactivates switch 113 to place flip-flop 90 in condition for full automatic operation. As this occurs, flip-flop 90 activates drive motors 70 and 73 for master reels 3 and 4 in a matter such that the tape feed direction is from reel 3 to reel 4. Similarly, drive motor 47 is also activated to rotate the common capstan shaft 10 in the same feed direction, and pneumatic cylinders 21 and 17 are likewise activated to move pinch rollers 19 into operative engagement with master capstan 11 and to move pick-up transducer 12 into operative engagement with one track of tape 2, respectively. In addition, pneumatic cylinders 53, which control the position of the slave tape pinch rollers 54 in slave bank 5, are activated by means of flip-flop 91 to move the slave tapes in each recording station into operative engagement with capstan shaft 10, and pick-up reel drive motors 58 and drag motors 56 in slave bank 5 are also simultaneously activated by flip-flop 90.

Thereafter, the master tape proceeds from reel 3 to reel 4 and the information contained on one track thereof is picked up by transducer 12 and simultaneously recorded on each of the slave tapes in bank 5. When the majority of tape 2 has been wound on take up reel 4, a clear leader attached to the trailing edge thereof enters vacuum plenum 22. When the loop 27 in such plenum is formed completely of the clear leader, the light emitted from source 86 at the top portion of plenum 22 passes through the leader portion and is received by photoelectric cell 85, which cell is responsive to such ligh to produce an electrical signal. The signal is boosted by amplifier 93 and fed to flip-flop 90 which is operative to completely reverse the recording cycle. Firstly, all of the components previously in use are deactivated, that is pinch rollers 54 in slave bank 5 are moved to their inoperative postion, slave tape motors 56 and 58 in bank 5 are stopped, pinch roller 19 is moved into an inoperative position out of engagement with the master tape, and transducer 12 is moved out of engagement with the master tape. Next, drive motors 70 and 73 for master reels 3 and 4, as well as capstan drive motor 47 are automatically reversed to feed the tape from reel 4 to reel 3. Simultaneously, therewith, flip-flop 90 provides an output signal to once again activate cylinder 21 to place pinch roller 19 into operative engagement with the master capstan, and to activate cylinder 18 to place transducer 14 into contact with the second track of tape 2. In addition, motors 58 and 56 for the slave tape in bank 6 are activated by flip-flop 91 together with cylinders 82 for moving slave tape pinch rollers 79 into engagement with the drive capstan shaft. It should be noted that the signals generated by flip-flop 91 to energize slave bank 5 or 6 can only be emitted when the drive capstan shaft 10 comes to a complete stop. When this occurs, motion sense circuit 97 provides the necessary input to flip-flop 91 to permit the switching from one slave bank to the other. In addition to the reversal of the master tape feed direction and the switching from one slave bank to the other, flip-flop 90 also reverses the logic control for brake-clutch devices 62 and 63, so that the proper master tape tension and take-up feed speed can be maintained. It can be seen that when the majority of the tape reel 4 has been wound onto reel 3, photo-cell 87 will receive light from source 88 through the other clear leader portion of the master tape at the reel 4 end. The signal received by flip-flop 90 from photo-cell 87 once again reverses the operation of the master tape and switches back to slave bank 5.

The foregoing described embodiment has been included herein for illustrative purposes only, and is in no way intended to limit the scope of this invention. Modifications to this embodiment and further embodiments within the scope hereof will be apparent to those skilled in the art.

What is claimed is:

1. A magnetic tape duplicating apparatus for simultaneously recording information from a master tape on a plurality of slave tapes comprising, in combination, a play-back assembly for alternately transporting a master tape in a forward and reverse direction along a tape path including transducer means to pick up information therefrom while such tape is traveling in either direction; and a pair of multiple recording slave banks for duplicating said recorded information on a plurality of slave tapes; said banks being alternately operable such that all of the slave tapes of one bank are simultaneously recorded in the forward direction of the master tape, and all of the slave tapes of the other bank are simultaneously recorded in the reverse direction of the master tape to maintain continuous multiple duplication in both master tape directions.

2. A magnetic tape duplicating apparatus in accordance with claim 1, further comprising an automatic direction control system to reverse the direction of the master tape and correspondingly switch from one slave bank to the other when the master tape has been fully advanced in either direction

3. A magnetic tape duplicating aparatus in accordance with calim 1, in which each slave bank comprises a plurality of individual recording stations for each slave tape, and an independent recording transducer disposed within each such station.

4. A magnetic tape duplicating apparatus in accordance with claim 3, further comprising a multiple amplification and recording circuit connecting the transducer means of the playback assembly and each of the independent recording transducers in both slave banks.

5. A magnetic tape duplicating apparatus in accordance with claim 1, in which the playback assembly comprises bi-directional take-up and feed reels; a reversible drive motor associated with each of said reels; and a clutch brake device linking each drive motor to its corresponding reel to control the take-up and feed speed of the master tape.

6. A magnetic tape duplicating apparatus in accordance with claim 5, in which the clutch brake device are of the pneumatic type whereby the amount of air pressure feed thereto controls the drag placed upon the particular reel to which it is connected.

7. A magnetic tape duplicating apparatus in accordance with claim 1, further comprising a common capstan drive means for the master tape playback assembly and both slave banks to simultaneously advance the master and slave tapes and to maintain speed synchronization therebetween.

8. A magnetic tape duplicating apparatus in accordance with claim 7, in which the common capstan drive means comprises an elongated cylindrical shaft disposed centrally of the playback assembly and extending between the two slave banks; said shaft being operatively connected to a reversible drive motor to impart the desired rotational movement thereto.

9. A magnetic tape duplicating apparatus in accordance with claim 8, in which the drive capstan shaft has a stepped up diameter in the playback assembly for advancing the master tape at a speed greater than the slave tapes.

10. A magnetic tape duplicating apparatus in accordance with claim 1, in which the playback assembly includes means for controlling the master tape speed and tension.

11. A magnetic tape duplicating apparatus in accordance with claim 10, in which the means for controlling the master tape speed and tension comprises a pair of elongated vacuum plenums positioned along the master tape path, each having an open end adapted to receive therein a loop of master tape and a pressure port at a midpoint thereof; means connected to a closed end of each plenum to reduce the pressure therein; and pressure sensitive means connected to the pressure port of each plenum and responsive to the pressure therein which varies according to the position of the tape loops with respect to the pressure port; said pressure sensitive means being adapted to emit control signals to increase or decrease the tape loop sizes, and thus maintain a constant speed past the transducer means.

12. A magnetic tape duplicating apparatus in accordance with claim 2, in which the master tape has a transparent leader attached to both ends; and the automatic direction control system comprises a pair of photo-electric cells each disposed in the tape path adapted to sense the transparent leader at both ends of said master tape.

13. A magnetic tape duplicating apparatus in accordance with claim 1, in which the master tape has at least two tracks, one of which is recorded in the forward direction and the other of which is recorded in the reverse direction; and the transducer means comprises a pair of heads, the first being adapted to pick up recorded information from the first track of the master tape when the tape is traveling in a forward direction and the other being adapted to pick up recorded information from the second track when the tape is traveling in the reverse direction.

14. A magnetic tape duplicating apparatus in accordance with claim 8, in which the slave banks are arranged in parallel juxtaposition on opposite sides of the capstan shaft, so that the rotation of the capstan in one direction advances the slave tapes in one bank, and the rotation of the capstan in the other direction advances the slave tapes in the other bank.

15. A magnetic tape duplicating apparatus in accordance with claim 14, in which a series of automatically operated pinch rollers are disposed in each slave bank in operative engagement with each slave tape to hold such tapes in contact with the capstan shaft when the particular bank in which such tape is located is in operation; said pinch rollers of each bank being alternately operable such that all of the slave tapes in one bank are held in contact with the capstan shaft while the master tape is traveling in one direction and all of the slave tapes in the other bank are held in contact with the capstan shaft while the master tape is traveling in the opposite direction.

16. A magnetic tape duplicating apparatus for recording information from a master tape on a plurality of slave tapes comprising, in combination, means for alternately transporting a master tape in either a forward or reverse direction; means for retrieving recorded information from the master tape while the same is transported in either direction; means for automatically changing the transport direction of the master tape from forward to reverse and reverse to forward when such tape has been fully advanced in either direction; means for advancing a first plurality of slave tapes past a corresponding plurality of recording heads simultaneously with the transport of the master tape in the forward direction to record the information retrieved from the master tape on said first plurality of slave tapes; means for advancing a second plurality of slave tapes past a second corresponding plurality of recording heads simultaneously with the transport of the master tape in the reverse direction to record the information retrieved from the master tape on said second plurality of slave tapes; and control means activated by the means for automatically changing the master tape transport direction to alternately activate the means for advancing the first plurality of slave tapes and the means for advancing the second plurality of slave tapes to maintain continuous multiple duplication while the master tape is transported in both directions.

17. A magnetic tape duplicating apparatus in accordance with claim 16 in which the means for transporting the master tape, the means for advancing the first plurality of slave tapes, and the means for advancing the second plurality of slave tapes all include a common capstan drive means to advance and maintain speed synchronization between the master tape and each slave tape.

18. A magnetic tape duplicating apparatus in accordance with claim 17 in which the common capstan drive means comprises an elongated cylindrical shaft mounted for bi-directional rotational movement and adapted to operatively engage the master tape and each slave tape.

19. A magnetic tape duplicating apparatus in accordance with claim 16 further comprising a multiple recording circuit operatively connecting the means for retrieving recorded information from the master tape and the first and second plurality of slave tape recording heads.

20. A magnetic tape duplicating apparatus in accordance with claim 16 in which the means for transporting the master tape includes a vacuum chamber adapted to receive a loop of the master tape therein, and having pressure sensitive control means responsive to the internal pressure of the chamber, which varies according to the size of the loop, to maintain a constant master tape transport speed.

* * * * *